United States Patent [19]

Bruckdorfer et al.

[11] Patent Number: 4,635,724
[45] Date of Patent: Jan. 13, 1987

[54] CO₂-ENHANCED HYDROCARBON RECOVERY WITH CORROSION-RESISTANT CEMENT

[75] Inventors: Roderick A. Bruckdorfer; Samuel E. Coleman, both of Broken Arrow, Okla.

[73] Assignee: Dowell Schlumberger Incorporated, Tulsa, Okla.

[21] Appl. No.: 759,632

[22] Filed: Jul. 26, 1985

[51] Int. Cl.⁴ .................... E21C 33/14; E21C 41/02
[52] U.S. Cl. .................... 166/268; 166/90 L; 166/292; 106/97
[58] Field of Search .............. 166/244.1, 268, 285, 166/292, 293, 90 L; 106/89, 97, 98

[56] References Cited

U.S. PATENT DOCUMENTS

| | | | |
|---|---|---|---|
| 2,875,831 | 3/1959 | Martin et al. | 166/274 X |
| 3,064,957 | 11/1962 | Jacoby | 166/292 X |
| 3,298,438 | 1/1967 | Anthony et al. | 166/310 X |
| 4,210,457 | 7/1980 | Dodson et al. | 106/97 |

Primary Examiner—George A. Suchfield
Assistant Examiner—Thomas J. Odar
Attorney, Agent, or Firm—L. Wayne White

[57] ABSTRACT

In a hydrocarbon recovery system including $CO_2$ pressurization of an underground formation, a sealing cement comprised of Portland cement and Class C fly ash.

5 Claims, 1 Drawing Figure

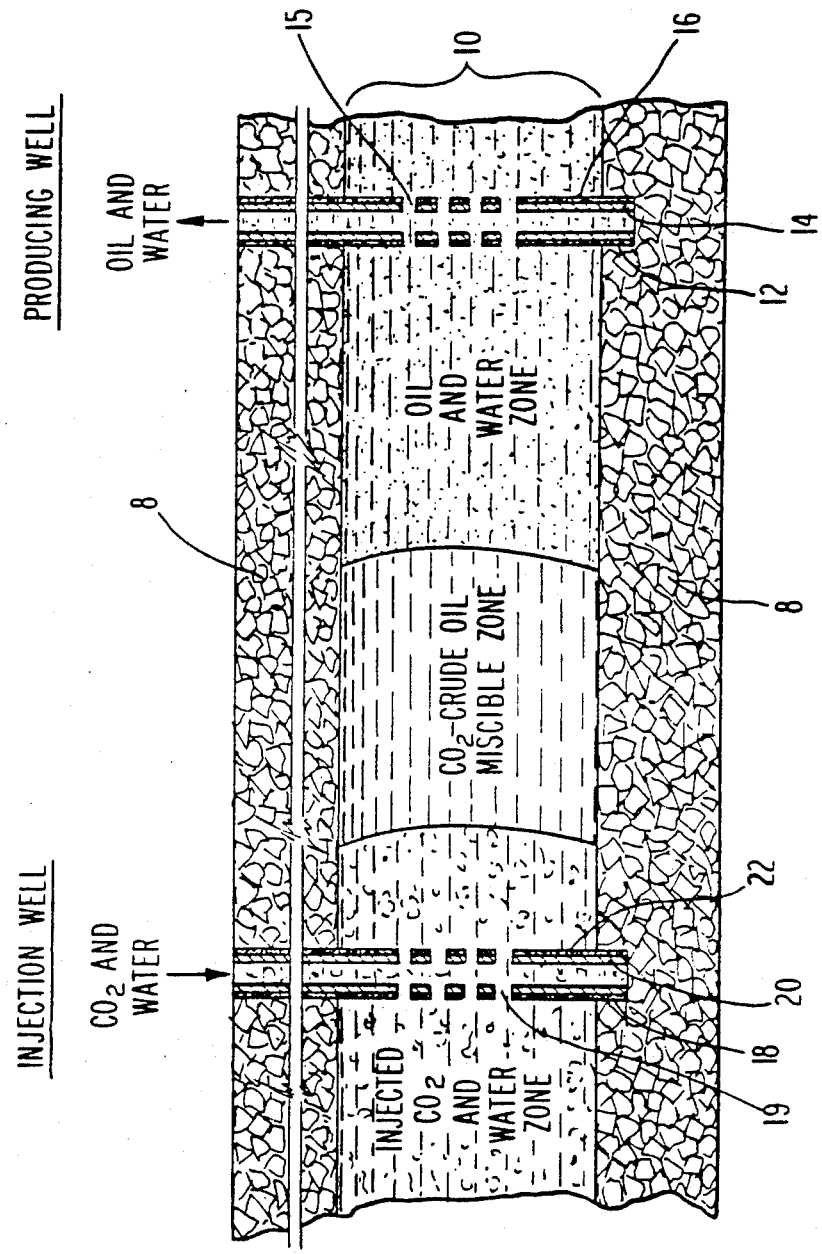

CO₂-ENHANCED HYDROCARBON RECOVERY WITH CORROSION-RESISTANT CEMENT

BACKGROUND

This invention pertains to carbon dioxide ($CO_2$)-enhanced recovery systems for crude oil and natural gas with improved $CO_2$-corrosion resistant cement and to methods of providing $CO_2$-resistant encasement of metal tubular members in a $CO_2$-rich environment.

Enhanced production of crude oil or natural gas (generally referred to as hydrocarbons) from partially depleted underground deposits thereof by the injection or pressurization of the underground formation including the deposit with carbon dioxide ($CO_2$), injected alternately or together with water, is known. Such processes are described, for example, in "Carbon Dioxide: Miscible Flooding Methods", "Effective Water Injection," SPE (June, 1975), 217, Oil and Gas Journal, Dec. 27, 1982. The $CO_2$ corrosive attack on well cement and metal tubular goods in the injection or production wells of such systems has been identified as a significant potential problem. See for example, "Effects of Super-Critical Carbon Dioxide on Well Cements"—Onanan, Halliburton Services, SPE 12595 and "Carbon Dioxide Corrosion Resistance in Cements"—Bruckdorfer, Dowell Schlumberger, CIM 85-36-61. These publications detail the chemical mechanism of the $CO_2$-corrosion attack on Portland cement and secondarily on metallic members exposed to a $CO_2$-water environment. These corrosive factors may be adversely affected by the high pressure and high temperature often present at the depth of subterranean formations in which hydrocarbon deposits are found.

It is, therefore, a general object of the present invention to provide enhanced hydrocarbon recovery systems including means for injecting $CO_2$ into subterranean hydrocarbon formations and including means for minimizing $CO_2$-corrosion attack on system components particularly including well sealing cements.

BRIEF DESCRIPTION OF THE INVENTION

Briefly, the present invention comprises a method of providing a $CO_2$-corrosion resistant encasement for a tubular member in a bore hole, particularly in an injection or product recovery well of a $CO_2$-enhanced hydrocarbon recovery system, by surrounding the tubular member in the bore hole with a Portland cement slurry including, on a dry weight basis, about 30–65% Class C fly ash and about 70–35% Portland cement. Upon hardening, the $CO_2$-corrosion resistant cement composition provides an effective seal of the tubular member and enhanced resistance of that sealing cement to $CO_2$-corrosion, notwithstanding the corrosive environmental influences of heat, temperature, $CO_2$ and water. This is important since the system also includes means for injecting $CO_2$, and often water, for pressurization of a hydrocarbon-containing subterranean formation.

The Portland cement slurry should have a density of about 15-17 pounds per gallon with about 16–16.4 pounds per gallon preferred. In general, the dry weight ratio of Class C fly ash to Portland cement in the slurry may be from about 1:2 to about 2:1. While essentially any Portland cement may be used, Class H Portland cement is preferred.

For a better understanding of the present invention, reference may be made to the following detailed description thereof, taken in conjunction with FIG. 1 and the subjoined claims.

BRIEF DESCRIPTION OF FIG. 1

FIG. 1 is a diagramatic cross-sectional view of a portion of the earth's surface and subsurface, particularly including an underground formation containing a hydrocarbon deposit and including a producing well and an injection well for pressurizing the underground deposit by injection of carbon dioxide and water.

DETAILED DESCRIPTION OF THE INVENTION

The present invention pertains to $CO_2$-enhanced hydrocarbon recovery processes wherein the corrosive influence of high concentrations of $CO_2$ in combination with water adjacent well-sealing cements is counteracted by the provision of a sealing cement composition specifically adapted to resist the $CO_2$ corrosive influence. A diagrammatic illustration of such a system in which $CO_2$-enhanced recovery is utilized is shown in the figure. Diagramatically illustrated there is an underground rock formation 8 in which is entrapped a hydrocarbon-containing formation 10, typically sand and shale, in which is trapped crude oil and/or natural gas. Formation 10, sometimes referred to as a pay zone, may be tapped for primary recovery of the hydrocarbon fluid by an oil well, typically comprising a bore hole 12, including a central metallic tubular member 14 and a sealing cement 16 occupying the space and surrounding and sealing that space between tubular member 14 and hydrocarbon-bearing deposit or formation 10. Naturally occuring pressure in the underground formation forces the hydrocarbon out of the formation and through perforations 15 in the tubular member 14 and surrounding sealing cement 16 and up through tubular member 12 to the surface.

When the naturally occuring pressure in the pay zone has been relieved, secondary recovery may be effected by water or polymer flooding of the pay zone. The present invention pertains to another recovery method where a hydrocarbon deposit is recovered by means of pressurized injection of fluids into the pay zone, particularly the pressurized injection of carbon dioxide.

As shown in FIG. 1, this is typically accomplished by injecting the fluid through one or more injection wells and recovering the hydrocarbon through one or more production wells which are in fluid communication with said injection wells. The injection wells are also comprised of a bore hole 18, a central tubular member 20 and a sealing cement 22 occupying the angular space between tubular member 12 and bore hole 18 with perforations 19 to permit injection of $CO_2$ and water through tubular member 20 and into the hydrocarbon-bearing formation 10.

Typically, the $CO_2$-enhanced recovery project encompasses an oil field covering many acres and includes a plurality of injection wells and production wells spaced from one another so that the hydrocarbon deposit within the pay zone or formation 10 is driven by pressure created at the injection wells toward the producing wells. For this purpose, $CO_2$ may be injected in alternating cycles with water or together with water under pressure sufficient to dissolve at least a portion of the $CO_2$ into the oil in much the same way as $CO_2$ is dissolved in a bottle of soda water, thus facilitating the hydrocarbon to flow more easily toward the producing wells.

Necessarily, this process exposes a sealing cement surrounding metallic tubular members in the various wells to the corrosive influence of carbon dioxide in combination with water, forming carbonic acid, often under conditions of high temperature and pressure.

The possible adverse consequences of corrosive attack on the sealing cement are loss of pressure from the hydrocarbon-bearing formation, the formation of seepage paths along the cement casing, and the possible breakdown of the sealing cement exposing the tubular member encased therein to the acidic $CO_2$-laden corrosive environment.

To provide a $CO_2$-enhanced hydrocarbon recovery system in which these consequences are minimized and the $CO_2$ corrosion attack inhibited, there is provided in accordance with the present invention a sealing cement with enhanced $CO_2$-corrosion resistance. This cement composition is placed in the form of a pumpable water slurry comprised of water, about 40-65% Portland cement, preferably Class H Portland cement, and about 35-60% Class C fly ash (all on a dry weight basis). Conventional additives, such as retarders, dispersants and fluid loss control additives, may also be included. Generally, the weight proportion of Portland cement to fly ash is in the range of about 2:1 to about 1:2. While the density of the slurry can be varied, the slurry generally has a density of about 15-17 pounds per gallon, and a slurry density of about 16-16.4 per gallon is preferred. As defined in ASTM specification C618-80, Class C fly ash is that fly ash normally produced from lignite or sub-bituminous coal, which in addition to having pozzolanic properties typical of fly ash, also has some inherent cementitious properties. Some Class C fly ashes may contain lime contents higher than 10%.

The utilization of various types of fly ash as additives in Portland cement mixes is also well known and the influence of such additives on pore size distribution and permeability has been specifically studied. See, for example, "Influence of Pozzolanic, Slag, and Chemical Admixtures on Pore Size Distribution and Permeability of Hardened Cement Pastes"—Manmohan and Mehte, *Cement, Concrete and Aggregates*, pages 63-67 (ASTM 1981). Class C fly ashes have been used specifically as additives for low-porosity high-strength concretes, which were studied for corrosion resistance in highway bridge decks, Coleman, Maage, and Diamond, *Cement and Concrete Research*, 670-678, Volume 14, No. 5, Pergamon Press, Ltd. (1984).

Even with this information (and much more) available, there nevertheless remains a need for an improved well sealing cement with corrosion-resistance properties suitable for use in an underground $CO_2$-water-laden environment.

This need is met, in accordance with the present invention by encasing a bore hole tubing with a Portland cement slurry adapted to harden into a $CO_2$-corrosion resistant cement, the slurry comprising, in addition to water in Portland cement, at least about 35% Class C fly ash, the slurry having a density of about 15-17 pounds per gallon. Preferably, this Portland cement is a Class H cement. Preferably, the density of the slurry is about 16-16.4 pounds per gallon.

In its most general form, the invention comprises a $CO_2$-enhanced hydrocarbon recovery system including means for injecting carbon dioxide into an underground hydrocarbon-bearing deposit formation. This system includes at least one well comprising a bore hole and a tubular member extending through the bore hole from the surface of the earth to the zone(s) in an underground formation containing hydrocarbon or in fluid communication with such zones. The tubular member is surrounded by a cement which fills the annular space between the tubular member and the formation. The cement is implaced as a pumpable slurry and forms a seal upon hardening. The Portland cement slurry contains a composition as defined above.

The efficacy of this invention has been demonstrated by laboratory tests in which cement formulations of the type used in the present invention have been compared with similar formulations using Class F rather than Class C fly ash and/or no fly ash at all. Carbonation penetration depth and strength retention in a $CO_2$-saturated water environment have been the primary criteria for evaluating the $CO_2$-corrosion resistance of the cement formulation and upon which it has been concluded that formulations specifically including at least about 35% Class C fly ash are particularly adapted for use in the underground pressurized wet $CO_2$ exposure of well sealing cements.

EXAMPLE 1

This series of experiments demonstrates the effect of Class C fly ash theron.

For this example, cylindrical macrosamples of 1-in. OD×2-in. [2.54-cm OD×5.05-cm] were cast using a 50-cc disposable plastic syringe as a mold. Before preparing the cement slurry and casting the sample, the plunger was removed and the syringe tip was sealed. All cement slurries tested were prepared according to API Specification 10, Section 5, using distilled water. Before mixing the slurry, a defoaming agent was added to the mix water to reduce air entrainment. The cement samples were cast by slowly pouring the slurry down one side of the syringe barrel, then puddling the cement with a stirring rod (API Specification 10, Section 5) to remove any trapped air. After sealing the syringe with a rubber stopper, the samples were cured for 72 hours at 3,000 psi [20.68 MPa] and 175° F. [79.4° C.]. The samples were demolded by cutting off the syringe's tip end, placing the mold in warm water to expand the plastic and pushing the cured cement cylinder out of the barrel with a syringe plunger.

Cement samples were carbonated by loading them in the autoclave in a sample holder. After filling the chamber with water and sealing, liquid carbon dioxide was injected into the water using a sparge tube connected to a carbon dioxide tank until 900 psi [6.21 MPa] was recorded. The test chamber was recharged every two to three days over the four- to six-week carbonation period. Temperature and pressure were maintained at 175° F. [79.4° C.] or 125° F. [51.7° C.] and 3,000 psi [20.68 MPa]. To eliminate any effects temperature and pressure had on the results, a second autoclave was used for a control sample set. This was run under the same conditions as the test set except that the chamber was not charged with carbon dioxide.

Carbonic acid corrosion effects on the macrosample sets were determined using compressive strength and carbonation penetration depth measurements. Compressive strengths of the 1-in. OD×2-in. [2.54-cm OD×5.08-cm] samples were measured by first cutting off 0.5-in. [1.27-cm] of each cylinder end, then milling the end surfaces perpendicular to the cylinder's axis. This was done to remove any deteriorated cement at the sample ends and to ensure that the cylinder was perpendicular to the instrument's platens, both of which cause scattering in the test results. Compressive strengths were determined using a Baldwin instrument. Because the length-to-diameter ratio was less than two, the resultant strengths were multiplied by 0.91 to obtain corrected compressive strengths (ASTM Standard C42-68).

The depth the carbonic acid penetrated into the cement was determined by staining the freshly cut end of a cylinder with a 1% phenolphthalein solution. By measuring the unstrained area, which indicates no calcium hydroxide is present in the cement matrix, the depth of carbonic acid invasion into the matrix was determined.

With respect to dimensional stability, in all cases tested, carbonation resulted in a net positive expansion as compared to control sample. Two formulations were prepared with Class C cement mixed at a slurry density of 15.6 pounds per gallon. One of these mixtures included 40% Class C fly ash. This mixture also included 0.4% (by weight of cement) of other minor additives. To achieve constant density the fly ash formulation included 37% water, and the 100% Portland cement (Class C) formulation included 47% water.

The carbonated sample of the Class C fly ash-containing formulation exhibited a penetration depth of 0.20 inches versus a penetration depth of the comparable 100% Class C Portland cement slurry (without other additives) of 0.54 inches. Thus the Portland cement without Class C fly ash seemed to be much more susceptible to $CO_2$ attack than that with the fly ash formulation as used in the present invention.

Moreover, the carbonated sample of fly ash-containing cement exhibited a compressive strength of 7460 psi versus a compressive strength of the non-fly ash comparable cement formulation of 6150 psi.

EXAMPLE 2

The enhanced $CO_2$-corrosion resistivity of Class C fly ash-Portland cement combinations was further demonstrated using microcylindrical samples. The result of using microcylindrical samples was that carbonation effects were observable over relative short exposure periods compared to macrocylindrical cement samples.

Carbonation of these samples was effected as described in Example 1. This is believed to be representative of the potential $CO_2$ attack upon sealing cements surrounding tubular goods in the bore hole of producing or injection wells in a $CO_2$-enhanced recovery system.

Because in other testing it had been demonstrated that Class H Portland cements tend to be somewhat more $CO_2$-corrosion resistant than other types of Portland cement, and because there appears to be some discernible relationship between $CO_2$-corrosion resistivity and slurry density, further testing was conducted utilizing constant density slurries and Class H Portland cement in combination with Class F fly ash as compared to Class C fly ash. This is reported in the following formulation listings by reference to the fly ash class.

Table I summarizes strength data on a variety of cement formulations useful in the present invention and comparative data for cement formulations without fly ash or with a different type of fly ash (i.e., Class F fly ash).

TABLE I

EFFECTS OF FLY ASH ON PORTLAND CEMENT STRENGTH LOSS AFTER $CO_2$ CARBONATION AT 175° F. AUTOCLAVE EXPOSURE AT SLURRY DENSITY OF 16.0 POUNDS PER GALLON

| Run No. | Portland Cement Class and Source | Fly Ash Class | % Fly Ash | % Strength Loss at 3 Weeks | % Strength Loss at 6 Weeks |
|---|---|---|---|---|---|
| 1. | Neat Maryneal Class H | — | 0 | 33 | 51 |
| 2. | Neat Maryneal Class H | (Class F) | 35 | 36 | 66 |
| 3. | Neat Maryneal Class H | (Class F) | 50 | 24 | 57 |
| 4. | Neat Maryneal Class H | (Class C) | 35 | −44 | 32 |
| 5. | Neat Maryneal Class H | (Class C) | 35 | −55 | 26 |
| 6. | Neat Maryneal Class H | (Class C) | 35 | −0.7 | 29 |

Similar results from the same compositions were produced with carbonation at 125° F. as shown in Table II.

TABLE II

EFFECTS OF FLY ASH ON PORTLAND CEMENT STRENGTH LOSS AFTER $CO_2$ CARBONATION AT 125° F. AUTOCLAVE EXPOSURE AT SLURRY DENSITY OF 16.0 POUNDS PER GALLON

| Run No. | Portland Cement Class and Source | Fly Ash Class | % Fly Ash | % Strength Loss at 3 Weeks | % Strength Loss at 6 Weeks |
|---|---|---|---|---|---|
| 7. | Neat Maryneal Class H | — | 0 | 33 | 47 |
| 8. | Neat Maryneal Class H | (Class F) | 35 | 36 | 58 |
| 9. | Neat Maryneal Class H | (Class F) | 50 | 24 | 50 |
| 10. | Neat Maryneal Class H | (Class C) | 35 | −0.7 | 26 |

The foregoing data indicate that the strength retention (or strength loss reduction) attainable in a system including $CO_2$-corrosion producing environment is much improved by the use of pipe-sealing cement comprising Portland cement in combination with Class C fly ash, as seen by comparison to similar formulations using Class F fly ash or no fly ash at all. Moreover, the data show that essentially no improvement is obtained as compared to 100% Portland cement by the inclusion therein of Class F fly ash.

While this invention has been described with reference to specific embodiments thereof, it is not limited thereto and the appended claims are intended to be construed to encompass not only those forms and embodiments of the invention disclosed and described above, but to such other variants and modifications thereof as may be made by those skilled in the art but which are nevertheless within the true spirit and scope of the present invention.

We claim:

1. In a system for producing a hydrocarbon fluid from a deposit of said fluid in an underground formation, carbon dioxide and water also being present in said formation, said system including at least one bore hole and a centrally disposed metal tube therein extending from ground level to said underground formation, the improvement consisting of a $CO_2$-corrosion resistant cement surrounding said tube and occupying the annular space between said tube and said formation, said cement comprising a hardened cement slurry comprised of Portland cement and Class C fly ash in a weight proportion of from about 1:2 to 2:1.

2. An improved system, as recited in claim 1, wherein said slurry has a density of about 16–16.4 pounds per cubic foot and includes about 35% fly ash and about 65% Portland cement on a dry weight basis.

3. An improved system, as recited in claim 2 wherein said Portland cement is Class H type Portland cement.

4. Method of providing a $CO_2$-corrosion resistant encasement for a tubular member in a bore hole extending into the earth from ground level, said method comprising surrounding said tubular member with a Portland cement slurry, including, on a dry weight basis, about 35–65% Class C fly ash and about 65–35% Portland cement and permitting said slurry to harden 5. In a method for collecting a hydrocarbon fluid product through a production well from a deposit of said fluid in an underground formation, said method including pressurizing said formation by injection of carbon dioxide and water through an injection well into said formation and including in at least one of said wells a bore hole and centrally disposed tube member therein extending from ground level to said underground formation, the improvement consisting of surrounding said tube member within said bore hole with a hardenable Portland cement slurry, comprising water, Portland cement and at least about 35% Class C fly ash on a dry weight basis, said slurry being adapted, upon hardening, to seal the space between said tube member and said formation with a $CO_2$-corrosion resistant cement.

* * * * *